US007130979B2

(12) United States Patent
Wong

(10) Patent No.: US 7,130,979 B2
(45) Date of Patent: Oct. 31, 2006

(54) DYNAMIC VOLUME MANAGEMENT

(75) Inventor: Wanmo Wong, Menlo Park, CA (US)

(73) Assignee: Micron Technology, Inc., Boise, ID (US)

( * ) Notice: Subject to any disclaimer, the term of this patent is extended or adjusted under 35 U.S.C. 154(b) by 340 days.

(21) Appl. No.: 10/232,952

(22) Filed: Aug. 29, 2002

(65) Prior Publication Data

US 2004/0044840 A1    Mar. 4, 2004

(51) Int. Cl.
*G06F 12/00* (2006.01)
(52) U.S. Cl. ................... 711/165; 711/105; 711/170; 711/153
(58) Field of Classification Search ................ 711/103, 711/170–173, 165
See application file for complete search history.

(56) References Cited

U.S. PATENT DOCUMENTS

| | | | |
|---|---|---|---|
| 4,580,211 A | 4/1986 | Doki et al. ................. 364/200 |
| 5,394,531 A | 2/1995 | Smith ......................... 395/425 |
| 5,778,442 A | 7/1998 | Ezzat et al. ................. 711/159 |
| 6,105,115 A | 8/2000 | Mathews et al. ........... 711/160 |
| 6,125,424 A * | 9/2000 | Komatsu et al. ........... 711/103 |
| 6,141,251 A | 10/2000 | Xing ..................... 365/185.11 |
| 6,141,731 A | 10/2000 | Beardsley et al. ......... 711/103 |
| 6,202,122 B1 * | 3/2001 | Yamada ...................... 711/103 |
| 6,226,728 B1 | 5/2001 | See et al. ................... 711/171 |
| 6,327,644 B1 | 12/2001 | Beardsley et al. ......... 711/136 |
| 6,378,043 B1 | 4/2002 | Girkar et al. ............... 711/133 |
| 6,401,160 B1 | 6/2002 | See et al. ....................... 711/5 |
| 6,427,186 B1 | 7/2002 | Lin et al. ................... 711/103 |
| 6,651,116 B1 | 11/2003 | Ludwig et al. .............. 710/33 |
| 6,732,222 B1 | 5/2004 | Garritsen et al. .......... 711/103 |
| 6,735,678 B1 | 5/2004 | Noble et al. ............... 711/165 |
| 2003/0163660 A1 | 8/2003 | Lam .......................... 711/170 |
| 2004/0044836 A1 | 3/2004 | Wong et al. ............... 711/103 |
| 2004/0044858 A1 | 3/2004 | Wong et al. ............... 711/156 |
| 2004/0044859 A1 | 3/2004 | Wong ......................... 711/156 |
| 2004/0044869 A1 | 3/2004 | Louie et al. ............... 711/165 |
| 2004/0044873 A1 | 3/2004 | Wong et al. ............... 711/218 |

OTHER PUBLICATIONS

Bach, Maurice J., "The Design of the Unix® Operating System", Bell Telephone Laboratories, Inc., Prentice-Hall, Inc., Englewood Cliffs, New Jersey, 1986, pp. xi-xiv and 271-311.
Jones, Richard, et al., "Garbage Collection Algorithms for Automatic Dynamic Memory Management", John Wiley & Sons Ltd., Chichester, England, 1996, pp. vii-xxvi and 1-41.
Silberschatz, Abraham et al., "Operating System Concepts, Fifth Edition", Addison Wesley Longman, Inc., 1998, pp. v-xvii and 239-336.
Tanenbaum, Andrew S., "Operating Systems: Design and Implementation", Prentice Hall, Inc., Englewood Cliffs, New Jersey, 1987, pp. vii-xvi and 191-250.
Intel®, "Intel® Flash Data Integrator (FDI) User's Guide", Version 4, Aug. 2001, pp. ii-314.

* cited by examiner

Primary Examiner—T Nguyen
(74) Attorney, Agent, or Firm—Dorsey & Whitney LLP

(57) ABSTRACT

A method for managing a range of memory in a flash memory space in which a plurality of data objects are stored. A volume defined for the range of memory has a first end and second end, with a respective list of data objects associated with each end. The volume can be resized, moved, and reallocated in the flash memory space without recompilation.

43 Claims, 9 Drawing Sheets

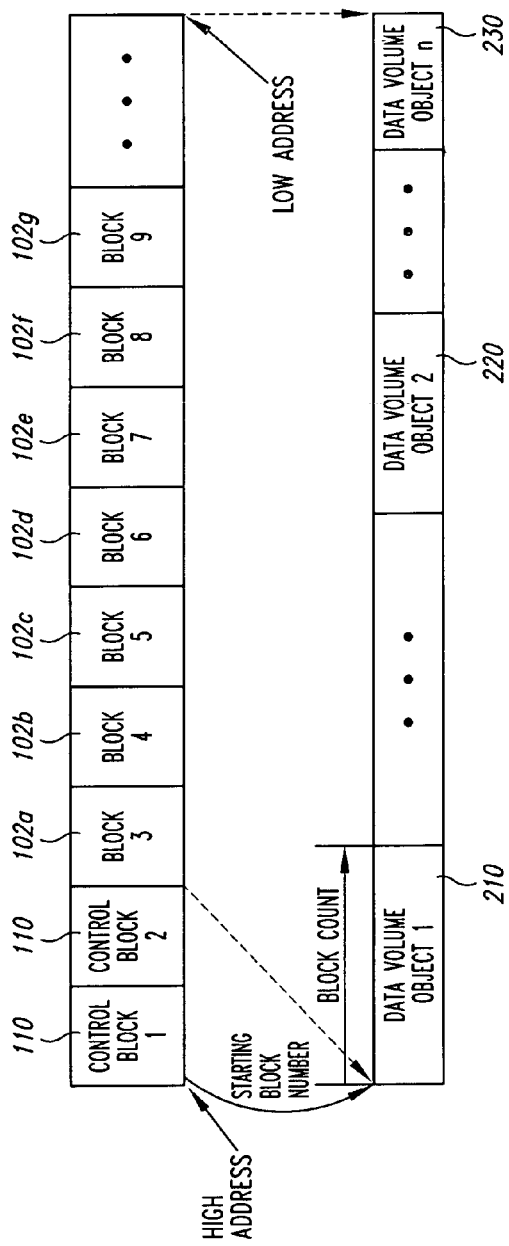
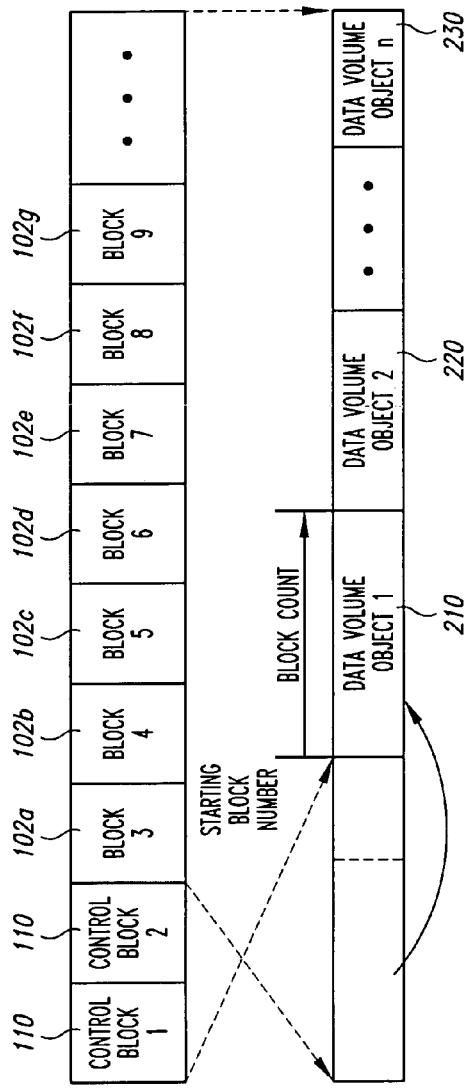
Fig. 2A
Fig. 2B

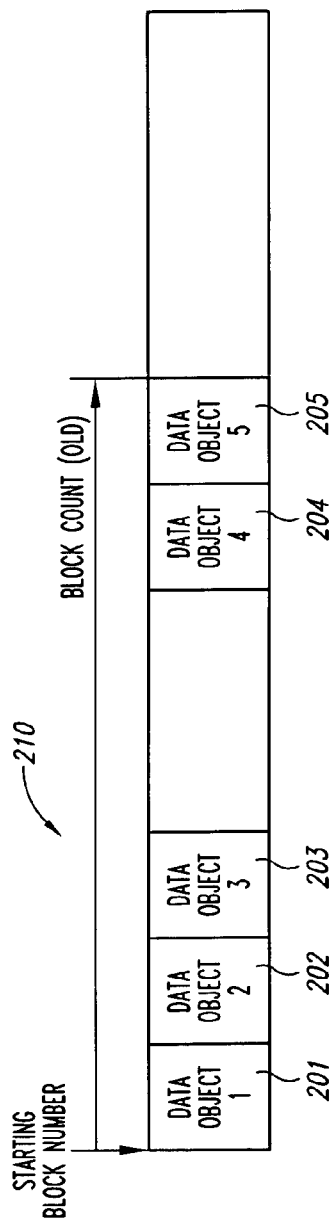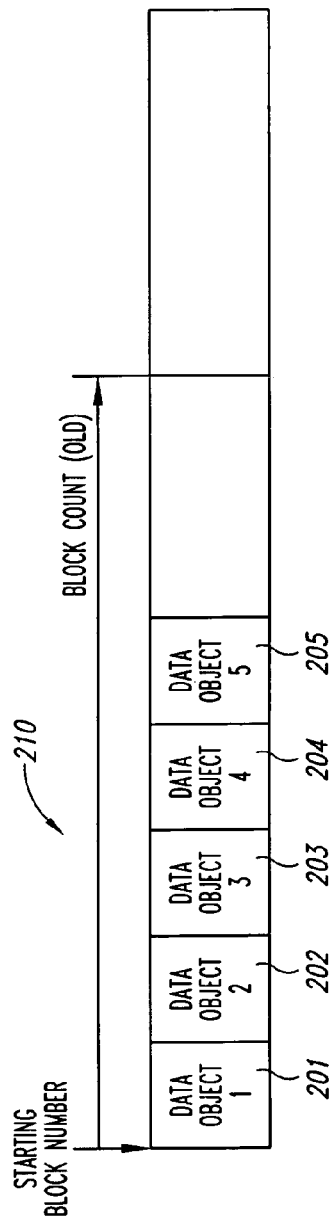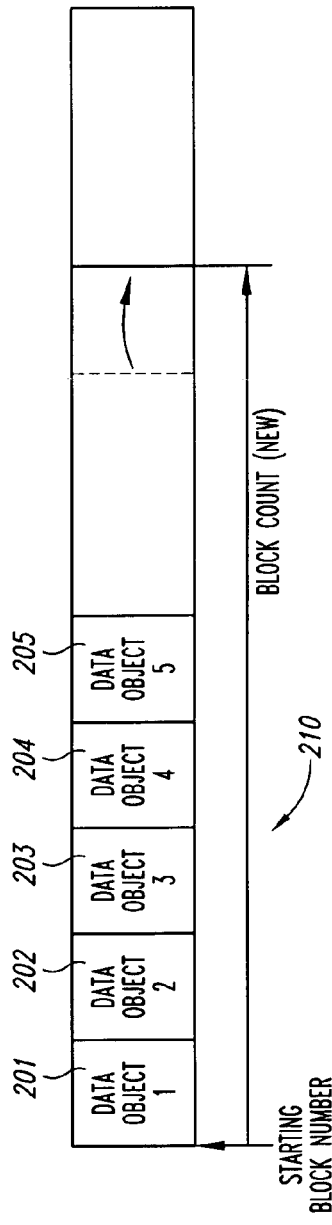

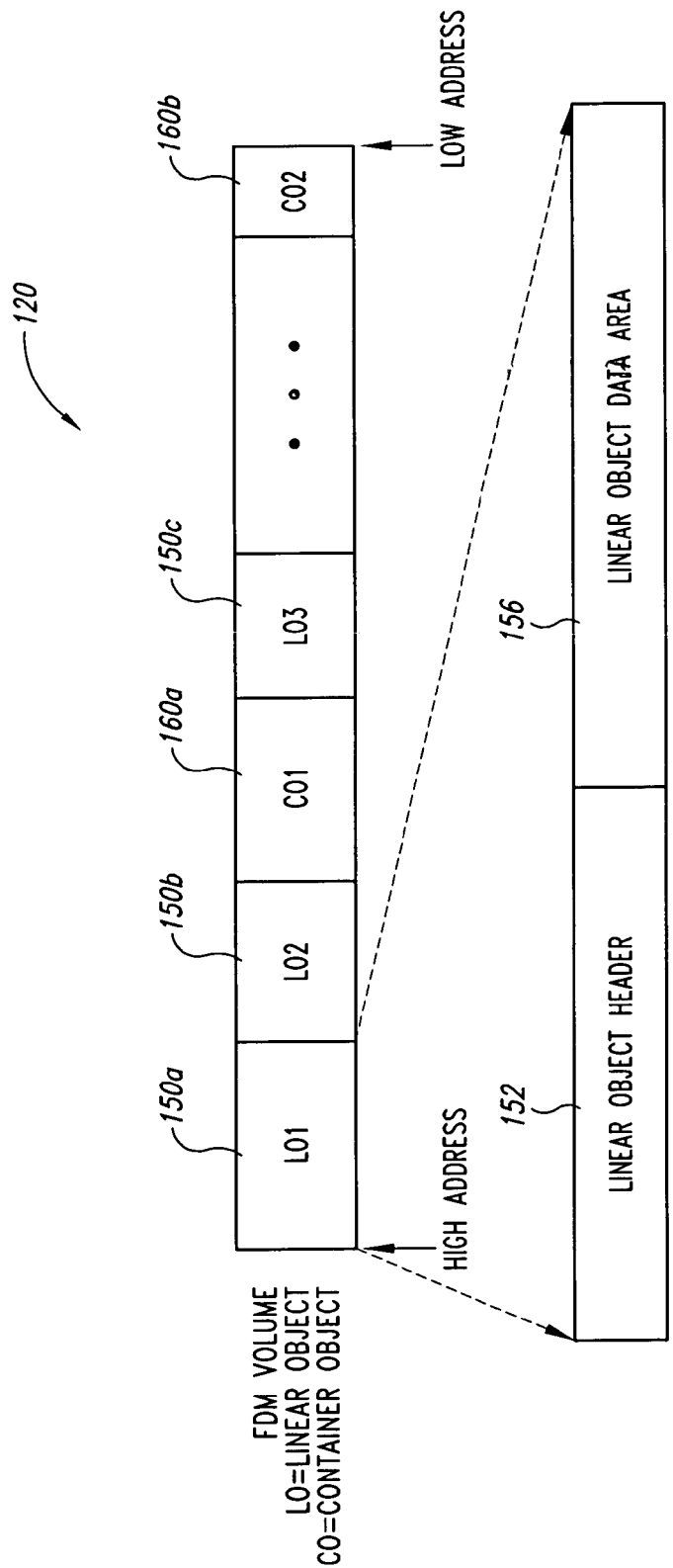

| NUMBER | STATE | BINARY VALUE | POWER LOSS RECOVERY ACTION | NEXT STATE | ACTION FOR NEXT STATE |
|---|---|---|---|---|---|
| 001 | EMPTY | 1111 1111 | NONE | WRITING_HDR_LEN | WRITE STATE AND LENGTH |
| 002 | WRITING_HDR_LEN | 1111 1110 | SKIP HEADER STATE AND LENGTH FIELDS | WRITING_HDR | WRITE STATE AND HEADER RECORD |
| 003 | WRITING_HDR | 1111 1100 | SKIP HEADER | WRITTEN_HDR | WRITE STATE |
| 004 | WRITTEN_HDR | 1111 1000 | SKIP HEADER AND DATA | WRITING_DATA | WRITE STATE AND DATA |
| 005 | WRITING_DATA | 1111 0000 | SKIP HEADER AND DATA | WRITTEN_DATA | WRITE STATE WHEN FINISH WRITING DATA |
| 006 | WRITTEN_DATA | 1110 0000 | CHANGE STATE TO VALID_DATA | VALID_DATA | WRITE STATE |
| 007 | VALID_DATA | 1100 0000 | NONE | INVALID_DATA | WRITE STATE |
| 008 | INVALID_DATA | 1000 0000 | SKIP HEADER AND DATA | ERASE_PARTIAL | ERASE DATA OUTSIDE THE FLASH BLOCK AND WRITE STATE |
|  |  |  |  | EMPTY | ERASE FLASH BLOCK |
| 009 | ERASE_PARTIAL | 0000 0000 | SKIP HEADER AND DATA UP TO FLASH BLOCK | EMPTY | ERASE FLASH BLOCK |

Fig. 9

DYNAMIC VOLUME MANAGEMENT

TECHNICAL FIELD

The present invention is related generally to the field of data object management, and more particularly, management of dynamic volumes in semiconductor memory devices, such as flash memory devices.

BACKGROUND OF THE INVENTION

Non-volatile memory is memory that can retain data and information even when power is not applied. An example of non-volatile memory that is being used in a variety of applications, such as cellular phone technology, is "flash memory." Flash memory is a form of electrically erasable programmable read-only memory (EEPROM), where data can be written in bytes and erased in blocks of memory. The blocks of memory typically range from 8 kBytes to 1 MByte in size. The cell density of flash memory devices can be very high, often as high as conventional dynamic random access memory (DRAM) cells, since in conventional flash memory a single floating gate structure is used for each memory cell. Flash memory devices also have relatively fast data access times. In the past, flash memory has been used in applications such as storing basic input/output system (BIOS) information in personal computers. However, with improvements in programming capabilities, and the continually increasing demand for persistent and low-power memory devices, the application of flash memory in many other areas has expanded very rapidly.

As previously mentioned, one such application is in cellular phones. At one time, cellular phones were only limited to voice communication. Now, cellular phones provide Internet access and web browsing capabilities, allow a user to capture and store computer graphic images, capture and playback video, and provide personal digital assistant (PDA) capabilities. As a consequence, cellular phones need to be able to store different types of data and information. For example, whereas older cellular phones would only need to store data representing phone numbers, newer cellular phones need to store phone numbers, voice information, graphics images, small applications (e.g., Java applets) downloaded from the Internet, and the like.

The various data objects that must be stored by the flash memory have different characteristics. For example, data such as phone numbers are generally small segments of data having uniform length. Other data can be variable in length, such as voice information, where the amount of memory used depends on the length of voice information recorded. Data can be packetized, as in the case where data is downloaded from the Internet. Additionally, the amount of memory consumed by data such as voice information, and image files, can be considerable, spanning multiple blocks of flash memory. Application code, such as a Java applet, is unique in that the binary code must be stored contiguously in flash memory to allow for the code to be executed by a processor directly from the flash memory.

Flash memory, which is non-volatile, and has low operating power, is perfectly suited for data and information storage applications such as in cellular phones where conservation of power is very desirable. However, the operating characteristics of flash memory must be adapted to facilitate storage of the different types of data and information previously described.

Flash memory, although providing many of the characteristics required for applications in portable and remote (wireless) devices, has unique operational characteristics that need to be considered. For example, because of the floating gate structure of conventional flash memory cells, data cannot be simply overwritten. The memory cells must be erased prior to writing new data. Also, as previously mentioned, flash memory devices are designed to erase data in blocks of memory cells, rather than on a cell-by-cell basis. Thus, although only a portion of the memory cells of a block need to be updated, the entire block must first be erased before programming the new data. The process of erasing an entire block of memory cells and programming new data takes a relatively long time to complete, and deferring an erase operation is often desirable. Additionally, erasing the entire block is a problem, however, in the case where another portion of the memory cells of the block do not need to be updated. Another issue related to flash, and other floating gate memory devices, is that these memory cells have a limited life-cycle where repeated cycles of erasing and programming degrade memory cell performance. Eventually, the cell performance is degraded to such a degree that the memory cell can no longer be used to store data.

In an effort to facilitate the use of flash products in applications such as cellular phones, memory management software interfaces have been developed to make the management of data storage in flash devices transparent to the user. The memory management software carries out various operations in the flash memory such as managing code, data and files, reclaiming memory when insufficient erased memory is available for programming new data, and wear-leveling flash blocks to increase cycling endurance. Memory management typically includes functions to support storage of parameter data for EEPROM replacement, data streams for voice recordings and multimedia, Java applets and native code for direct execution, and packetized data downloads. In addition to these operations, the memory management software often ensures that in the event of a power loss, previously programmed data is not lost or corrupted. An example of this type of memory management software is Intel® Flash Data Integrator (FDI) software.

Although conventional flash memory management software has succeeded in increasing the flexibility of flash memory, there is still room for additional improvement. Conventional memory management software has limitations in the area of data management. For example, in some conventional flash memory management software, the memory space of a flash device is partitioned into fixed memory address ranges and either code or data is associated with each of the ranges. Once set at compile time, the range and the type of associated data cannot be changed without recompilation. Consequently, if at a later time a different partitioning between code and data is desired, the ranges defined for the two types of data cannot be modified unless software is recompiled. Additionally, although different flash memory management software performs many of the same functions, the process by which the functions are performed can be very different, with some being more efficient or providing a greater level of data integrity than others. For example, where information regarding the mapping of data within a memory is maintained in a single table corresponding to one physical block of flash memory, corruption of the single table, such as in the event of a power failure during a write operation to the table, will leave the flash memory device in a questionable state. Another example is using only a single physical block of flash memory to aid in the reclamation process, which may result in an inefficient iterative write and erase when the data objects stored in memory are large and which may corrupt the data objects if interrupted by a power loss. Therefore, there is a need for alternative memory management processes that can be implemented flash memory devices.

SUMMARY OF THE INVENTION

The present invention is directed to a method for managing a range of memory in a flash memory space in which a plurality of data objects are stored. In one aspect of the invention, all valid data objects of a first list of data objects associated with a first end of the range of memory are copied to a second list of data objects associated with a second end of the range of memory. The valid data objects of the first list are invalidated, and the location of the first end of the range of memory is redefined to another location in the flash memory space.

In another aspect of the invention, a range of memory in a flash memory space in which a plurality of data objects are contained is managed by defining a starting block number representing a first end of the range of memory, defining a block count value identifying a second end of the range of memory relative to the first end of the range of memory, redefining the starting block number to move the range of memory in the flash memory space from a previous location to a current location, and copying valid data objects contained in the range of memory at the previous location to the range of memory at the current location. The valid data objects in the range of memory at the previous location are invalidated.

BRIEF DESCRIPTION OF THE DRAWINGS

FIGS. 2A and 2B are operational block diagrams illustrating a process of moving a volume according to an embodiment of the present invention.

FIGS. 3A–3C are operational block diagrams illustrating a process of resizing a volume according to an embodiment of the present invention.

FIG. 5 is a drawing of a linear object according to an embodiment of the present invention.

FIG. 9 is a table showing object states for data objects according to an embodiment of the present invention.

DETAILED DESCRIPTION OF THE INVENTION

Embodiments of the present invention are directed to management of dynamic volumes in a memory space, such as flash memory space. In the following detailed description of exemplary embodiments of the invention, reference is made to the accompanying drawings, which form a part hereof, and in which are shown, by way of illustration, specific exemplary embodiments in which the invention may be practiced. These embodiments are described in sufficient detail to enable those skilled in the art to practice the invention. However, it will be clear to one skilled in the art that the invention may be practiced without these particular details. Other embodiments may be utilized and modifications may be made without departing from the spirit or scope of the present invention. The following detailed description is, therefore, not to be taken in a limiting sense, and the scope of the present invention is defined only by the appended claims.

Figure 1:
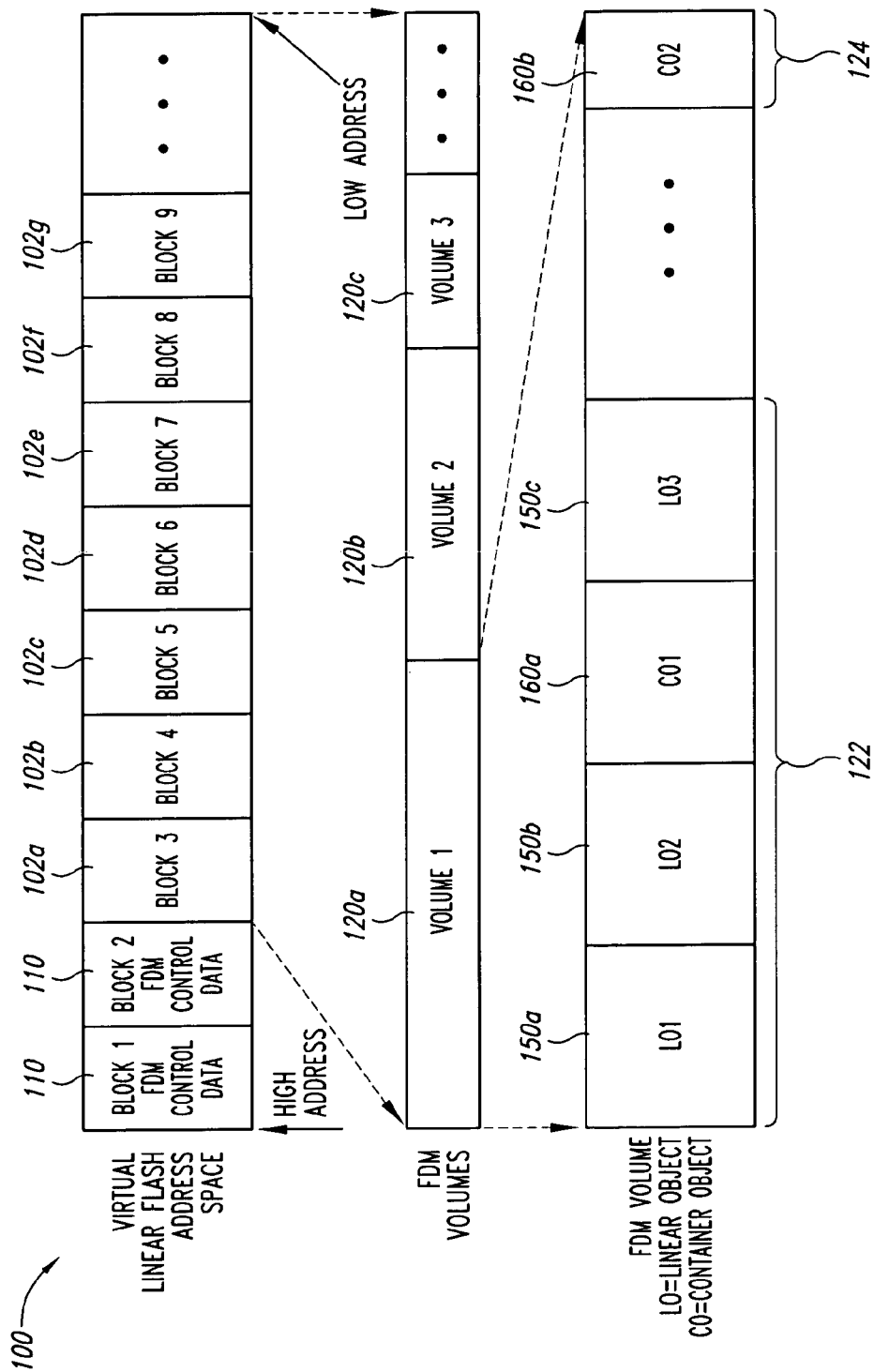
FIG. 1 is a drawing of a data architecture according to an embodiment of the present invention.

FIG. 1 shows a data architecture 100 according to an embodiment of the present invention. The data architecture 100 can be used by a flash data manager (FDM) process to handle data objects in a flash memory device. The data architecture 100 associates volumes 120 to physical flash memory blocks 102 of one or more flash memory devices. The volumes 120 can be variable in size, and can be modified by a developer subsequent to compilation. As will be discussed in greater detail below, an application can define new volumes 120 for the memory space of a flash device by adding new volume definition information. Moreover, the boundaries of a volume 120 can be adjusted during execution of an application by modifying the volume definition information. The volumes 120 can also span multiple flash memory blocks 102 and have boundaries that do not correspond to flash memory block boundaries. However, in this case additional overhead may be necessary to process the partial flash memory blocks during erasing and writing operations to the FDM volume 120.

Each of the volumes 120 has a contiguous range of memory that is defined by data written in FDM control blocks 110. In an embodiment of the present invention, two FDM control blocks 110 are used to store volume definition information. In this manner, one of the FDM control blocks 110 can be kept in an erased state while the other FDM control block 110 contains current volume definition information. Updating volume definition information requires new data to be written in the FDM control block. After the volume definition information is updated often enough, resulting in the volume definition information exceeding the available memory of one FDM control block 110, only the valid volume definition information is copied from the present FDM control block 110 to the FDM control block 110 in the erased state to allow for the memory of the other FDM control block to be reclaimed. The process of alternating between the two FDM control blocks allows volume definition information to be updated an unlimited number of times while ensuring that valid volume definition is available even in the event of a power loss.

The contiguous range of memory spans over a range of memory addresses that begin with a starting address and terminates with an ending address. An example of the type of data included in the FDM control blocks 110 is the starting block number and block count over which the volume 120 spans. It will be appreciated by one of ordinary skill in the art, however, that the particular data defining the volume 120, and the particular location where the data is stored can be modified without departing from the scope of the present invention. Within the range of memory, data objects can be stored. The memory space of volumes 120 is managed such that enough free memory space is reserved to contain a copy of the largest data object stored in the volume 120, plus one or two physical flash memory blocks 102. Each data object stored by the volume 120 is categorized as either a linear object 150 or a container object 160. A linear object 150 is generally used to store data in linear or consecutively addressed fashion, such as application code. In contrast, non-linear objects generally store data that can be stored in non-contiguous segments of memory. The container objects 160, on the other hand, are used to store non-linear data in a "linear" fashion. As a result, linear objects 150 and non-linear objects, in the form of containers 160, can be stored anywhere within the available memory space of the volumes 120, and partitioning the memory space of flash memory into two regions, one region specifically for linear data and another region specifically for non-linear data, is not necessary. Consequently, in embodiments of the present invention, the memory space of flash memory can be utilized in an open manner, storing data objects in the available memory space independent of the particular type of data, rather than accommodating a fixed partitioned memory space where the location at which data is stored in memory is governed by the particular data type (i.e., either linear or non-linear).

A more detailed description of the volumes 120, and object management thereof, is provided in commonly assigned, co-pending U.S. application Ser. No. 10/233,324, entitled LINEAR AND NON-LINEAR OBJECT MANAGEMENT, to Wong, filed Aug. 29, 2002, which is incorporated herein by reference. A more detailed description of data object management is provided in commonly assigned, co-pending U.S. application Ser. No. 10/232,841, entitled SYSTEM AND METHOD FOR LINEAR OBJECT REALLOCATION IN PLACE, to Louie et al., filed Aug. 29, 2002, which is incorporated herein by reference. Additionally, a more detailed description of the container objects 160, and object management thereof, is provided in commonly assigned, co-pending U.S. application Ser. No. 10/975,577, entitled SINGLE SEGMENT DATA OBJECT MANAGEMENT, to Wong et al., filed Oct. 28, 2004, and U.S. application Ser. No. 10/975,665, entitled MULTIPLE SEGMENT DATA OBJECT MANAGEMENT, to Wong et al., filed Oct. 28, 2004, which are both incorporated herein by reference.

The linear objects 150 and container objects 160 are stored in the volume 120 in two lists that are associated with a respective end of the contiguous range of memory. A list can be generally defined as a collection of data objects stored contiguously. A "top list" starts from a high memory address location and extends toward descending memory addresses of the range of memory as data objects are added to the end of the top list. In FIG. 1, data objects 150a, 150b, 160a, and 150c represent a top list 122 of the volume 120a. Conversely, a "bottom list" starts from a low memory address location and extends toward ascending memory addresses of the range of memory as data objects are added to the end of the bottom list. The data object 160b represents a bottom list 124 of the volume 120a. By having the "top" and "bottom" lists 122, 124 for each volume 120, a dual list arrangement is created. Each of the data objects within the volume 120 are cataloged in one of these lists.

As previously discussed, the volume 120 is dynamic and can be changed by an application by updating information defining the volume 120. For example, in a previously described embodiment of the present invention, the volume 120 is defined by data representing a starting flash block number and a block count describing the number of flash blocks over which the volume 120 spans. As shown in FIG. 2, the flash memory blocks 102 represent a flash memory space in which ranges of memory are defined for respective volumes 210, 220, and 230. The volumes 210, 220, and 230 are the same as the embodiment of the volumes 120 previously described in FIG. 1. Definition of the volumes 210, 220, and 230 are found in the FDM control blocks 110. In FIG. 2A, the volume 210 starts at the high addresses (i.e., left) of the flash memory space as indicated by the starting flash block number and extends to the low addresses (i.e., right) of the flash memory space for the block count value. In the event moving the volume 210 in the flash memory space is desirable, the starting flash block number of the volume 210 can be updated by an application to define a new flash block at which the volume 210 starts. Consequently, as shown in FIG. 2B, the volume 210 is shifted in the flash memory space. In the present example, the volume 210 remains the same size because the block count value does not change. In the process of moving the volume 210 in the flash memory space, the data objects contained therein are copied from the previous location to the new location based on the new starting flash block number. To facilitate power loss recovery, the target location for the volume 210 should not overlap the source location in order to maintain a valid copy of the volume 210 and the data objects contained therein in the event power is lost prior to completing the move to the new location. It will be appreciated that the blocks of flash memory corresponding region where the volume 210 is moved should be erased to allow data objects to be written therein.

Figure 4A:
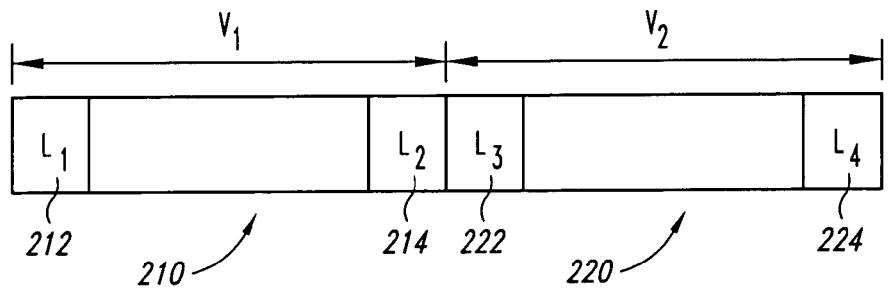
FIGS. 4A–4D are operational block diagrams illustrating a process of reallocating a memory space to volumes according to an embodiment of the present invention.
Figure 4B:
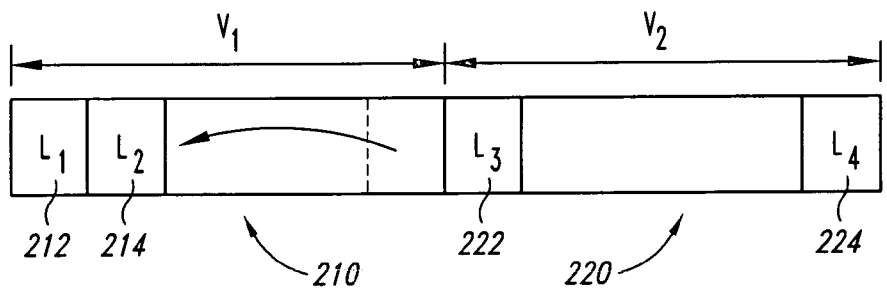
Figure 4C:
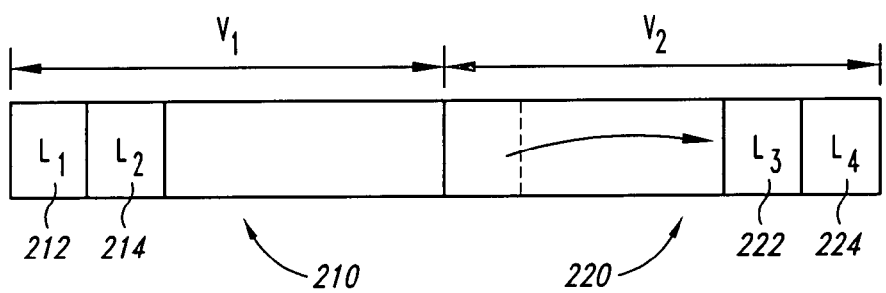
Figure 4D:

Changing the size of the volume 210 by an application is also easily accommodated by updating the volume definition information. The process of resizing the volume 210 will be explained with reference to FIG. 3. Prior to changing the size of the volume 210, the application will need to verify that sufficient memory space is available. As shown in FIG. 3A, the volume 210 includes a top list of data objects 201, 202, 203 and a bottom list of data objects 204, 205. Where the size of the volume 210 is to change from the bottom of the volume 210, the data objects 204, 205 of the top list are copied to the opposite end of the volume 210 against the end of the top list. That is, as shown in FIG. 3B, the data objects 204 and 205 are copied to be contiguous with the data object 203 in the volume 210. In FIG. 3C, the application then changes from the block count value (old) to the block count value (new) for the volume 210 to define a new range of memory for the volume 210. As a result, the volume 210 is resized. It will be appreciated that in the case where the volume 210 is increased in size, the blocks of flash memory corresponding to the additional memory should be erased to allow data objects to be written therein. The relative sizes of two volumes can also be changed by an application by modifying the volume definition information defining the two volumes. The process of reallocating a region of the flash memory space will be explained with reference with FIG. 4. As shown in FIG. 4A, volumes 210 and 220 are located adjacent to one another in a region of the flash memory space. The volume 210 includes a top list 212 of data objects located against the top boundary and further includes a bottom list 214 of data objects located against the bottom boundary of the volume 210. Similarly, the volume 220 includes a top list 222 of data objects that is located against the top boundary of the volume 220, which is coincident with the bottom boundary of the volume 210. The volume 220 further includes a bottom list 224 of data objects located at the bottom boundary of the volume 220. In changing the relative sizes of the volumes 210, 220, the data objects of the bottom list 214 and top list 222 at the boundary between the volumes 210, 220 will need to be moved to the opposite ends of the respective volume. That is, data objects of the bottom list 214 are copied to the end of the top list 212 as shown in FIG. 4B. Similarly, data objects of the top list 222 are copied to the end of the bottom list 224 as shown in FIG. 4C. With the data objects of the bottom list 214 and the top list 222 moved away from the boundary between the volumes 210, 220, the volume boundary can now be shifted to change the sizes of the respective volumes in order to reallocate the region of flash memory space. In FIG. 4D, the block count for the volume 210 is updated to change the number of flash blocks over which the volume 210 spans, and the starting flash block number and the block count for the volume 220 are also updated to reflect the change in volume size for the volume 220. It will be appreciated that the blocks of flash memory corresponding region where the boundary between the first and second volumes 210, 220 should be erased to allow data objects to be written therein.

It will be appreciated by those of ordinary skill in the art that the previously described operations have been provided by way of example, and are not intended to necessarily limit the scope of the present invention to those particular embodiments. It will be further appreciated that the particular steps previously described provide those of ordinary skill in the art sufficient understanding to practice the present invention, although minor details have been omitted in the interest of brevity.

It will be further appreciated that the use of the terms "top" and "bottom" lists have been used to aid in the understanding of embodiments of the invention. The particular association of a list with particular memory addresses in the previous description has been provided by way of example. The previous description is not intended to limit the present invention to a particular arrangement of top and bottom lists to high and low memory addresses. More generally, in embodiments of the present invention, first and second lists of data objects are associated with first and second ends of a volume.

As previously described, in an embodiment of the present invention, the data objects of the volumes 120 are categorized into linear objects 150 and container objects 160. FIG. 5 shows a linear object 150 according to an embodiment of the present invention. The linear object 150 includes a linear object header 152 and a linear object data area 156. The linear object header 152 includes various fields containing information related to the particular linear object 150. As previously discussed, one field included in the linear object header 152 is a state field that contains data representative of the object state of the linear object 150. The linear object key field in the linear object header 152 includes data used to uniquely identify the particular linear object 150, and the linear object data area 156 includes the data of the linear object 150. In the linear object data area 156, data is stored in a linear or consecutively addressed fashion. Examples of the types of data of a linear object 150 include application code, which is desirable to store in sequential memory addresses to allow for the code to be executed by a processor directly from flash memory.

Figure 6:
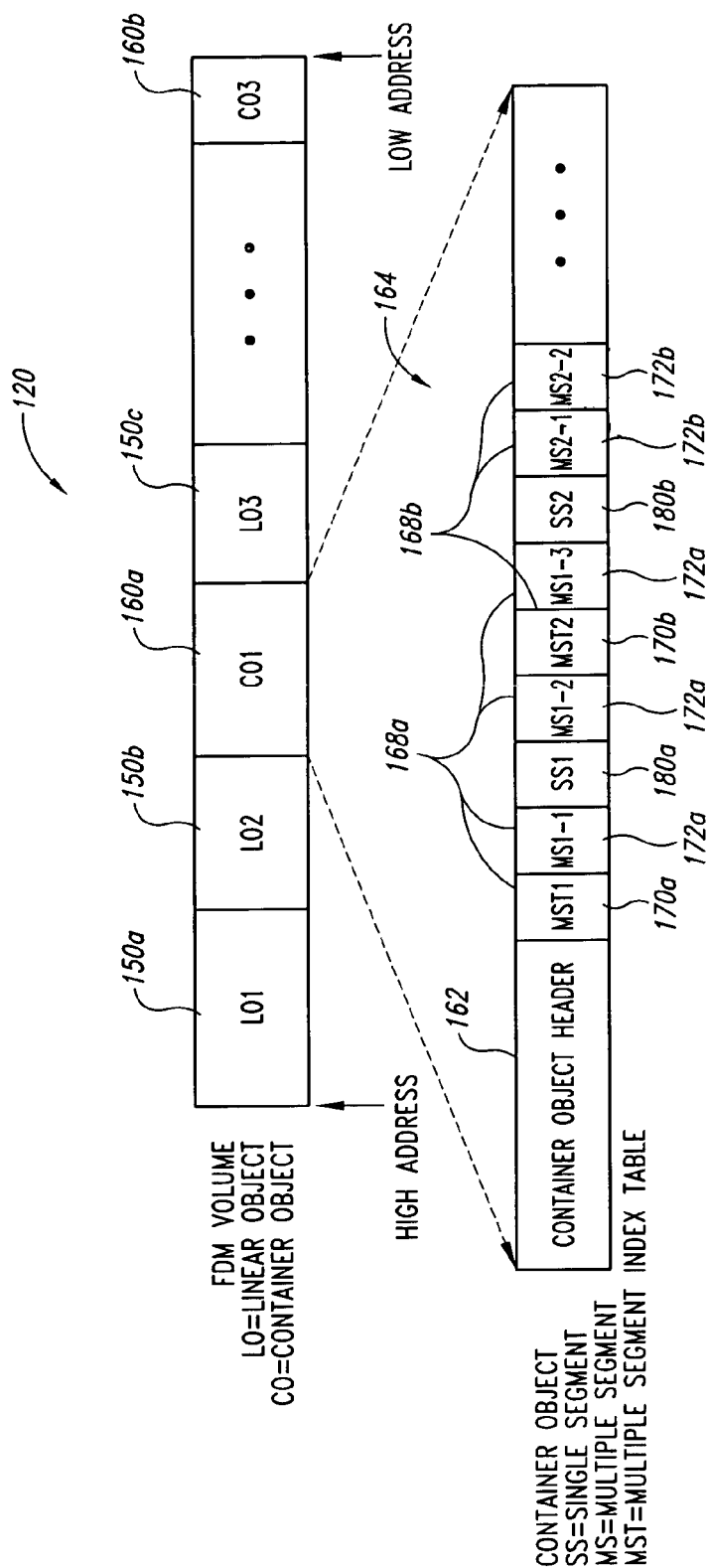
FIG. 6 is a drawing of a container object according to an embodiment of the present invention.

FIG. 6 illustrates the container object 160 according to an embodiment of the present invention. The container object 160 includes a container object header 162 and a container data area 164. As with the linear object headers 152 (FIG. 4), the container object header 162 similarly includes data related to the container object 160. For example, the container object header 162 includes a state field that contains data indicative of the object data state for the container object 160. In the container data area 164, data objects of a non-linear or non-consecutively addressed nature are stored. As will be explained in more detail below, the type of data objects stored in the data area 164 of the container object 160 generally represent data that can be stored in non-contiguous segments. The container object 160 is used to store the non-linear data in a linear fashion in the data area 164, thereby enabling linear data (i.e., linear objects 150) and non-linear data (i.e., container objects 160) to be intermixed throughout the available memory space of the volume 120. As illustrated in FIG. 6, the container object 160 includes non-linear objects in the form of multiple segment (MS) data objects 168 and single segment (SS) data objects 180.

Figure 7:
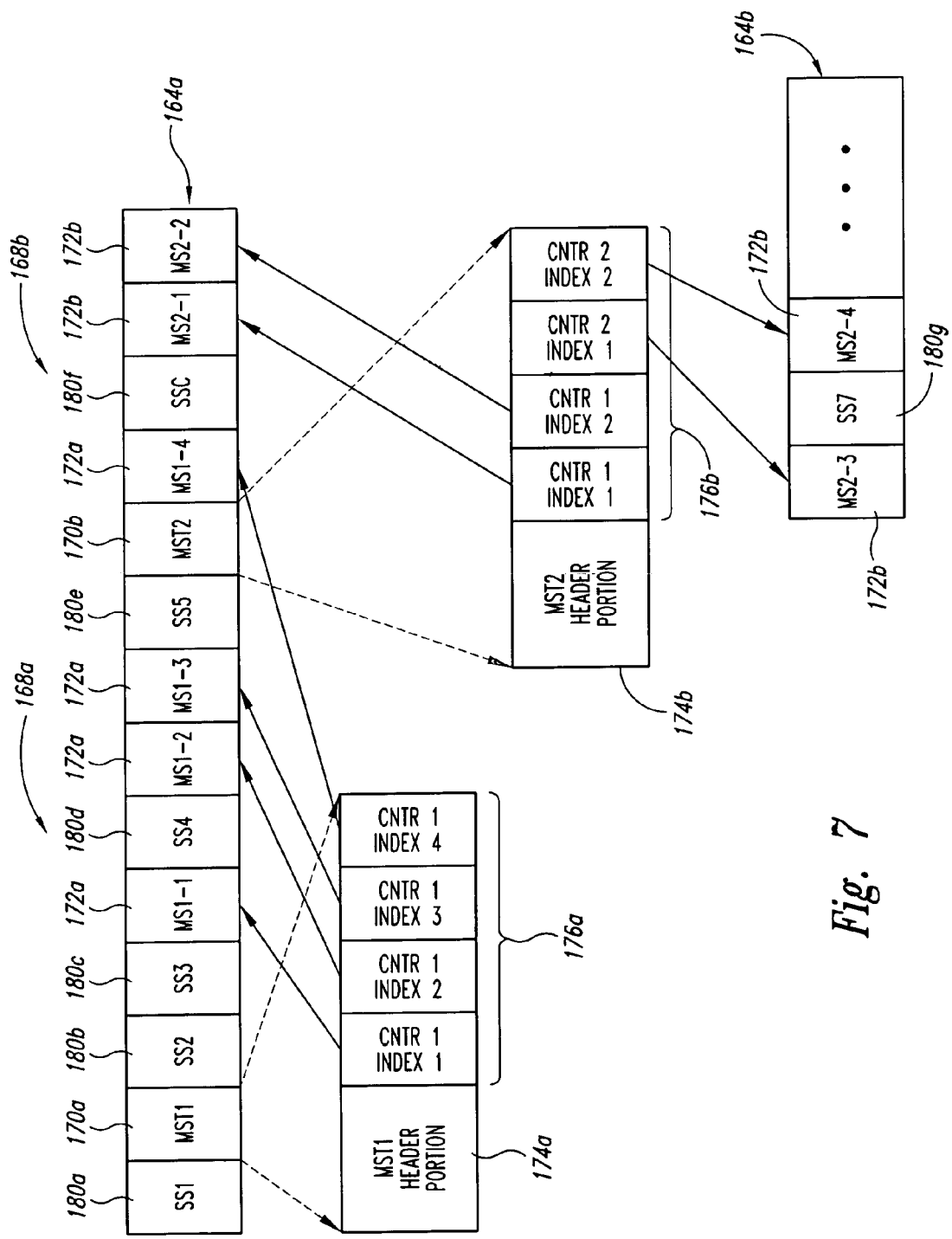
FIG. 7 is a drawing of a multiple segment data object in the container object of FIG. 6 in accordance with an embodiment of the present invention.

As shown in FIG. 7, MS data objects 168 represent multiple segments of data objects 172 that are associated with one another to form a relatively large data object in the form of a non-linear object. The structure uses two types of objects: MS data object index tables 170 and data segments 172, which can be stored in the container data area 164a, 164b along with SS data objects 180. The MS data object index tables 170 contain a header portion 174 which defines the state, identity, and other aspects of the MS data object 172, and an index table 176, which contains index entries that identify the data segments 172 comprising the body of the MS data object 168. As shown in FIG. 7, the index entries identify the container and an index entry for each data segment 172. Each data segment 172 has its own header (not shown) which defines its state, identity, and other aspects of that particular data segment.

The MS data object 168 can be embodied in more than one way. In one embodiment, a single MS data object index table 170 can be used for an entire MS data object 168, regardless of the size of the data object. In the MS data object 168, there is no limitation on the number or size of the data segments 172, as these parameters can be set by specifying them in the appropriate fields in the MS data object index tables 170 and data segment headers. A single MS data object index table 170 can potentially become quite large, in some instances, by writing a new MS data object index table 170 after each update. This may result in an index table that consumes a large portion of a container object and leaves only a small portion of the container object for storage of data segments or other non-linear objects. Moreover, a large MS data object 168 might result in a large index MS data object index table 170 that potentially could become significant to reallocate and rewrite. A second embodiment allows for multiple MS data object index tables 170 to be used to index the data segments 172 in the MS data object 168. Accordingly, only a shorter MS data object index table 170 might need to be reallocated and/or rewritten as data segments 172 are changed or added. As illustrated, the MS data object index tables 170 may span multiple container objects, thereby avoiding the issue with a single MS data object index table 170 consuming a large portion of a single container object. In the second embodiment, a next index table field (not shown) would identify the next MS data object index table 170 used to index the data object. In the first embodiment, the next index table field simply contains a NULL value to signify it is the only MS data object index table. Management of MS data objects 168 is discussed in greater detail in commonly assigned, co-pending U.S. application Ser. No. 10/975,665, entitled MULTIPLE SEGMENT DATA OBJECT MANAGEMENT, to Wong et al., filed Oct. 28, 2004, which is incorporated herein by reference.

Figure 8:
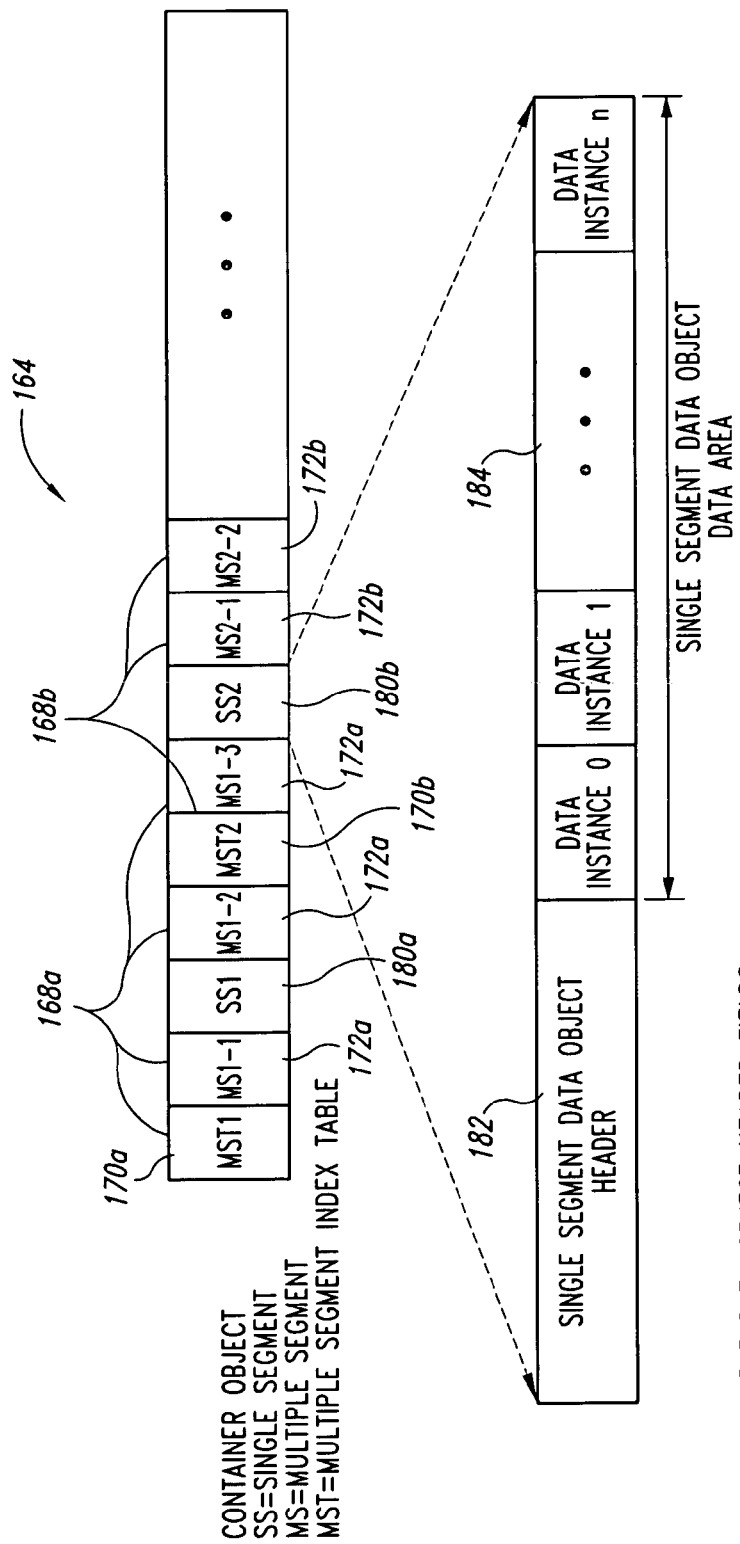
FIG. 8 is a drawing of a single segment data object in the container object of FIG. 6 in accordance with an embodiment of the present invention.

SS data objects 180, on the other hand, are relatively small and have data self-contained in a single segment of the memory space. As shown in FIG. 8, the SS data object 180 includes an SS data object header 182 and an SS data object data area 184. The SS data object header 182 contains various fields. As with the MS data object table header portion 174 (FIG. 7), the SS data object header 182 includes a state field that contains data representative of an object state of the SS data object 180. The SS data object data area is used to store instances of data having a length less than one read/write unit. A read/write unit is typically the minimum byte size that can be stored in memory and perform flash device input/output operations. The read/write unit is defined by a developer at compile time, and can be used as the default size of a SS data object 180 where the developer does not specifically define the length of the SS data object 180. However, the SS data object 180 is not restricted to a single read/write unit, and can be of greater length where desirable. For example, where it is anticipated that the data will be updated often, the developer can define the SS data object 180 to be greater than one read/write unit.

Within the SS data object data area, data instances can be updated "in place" by writing new data instances therein and changing the object state of an earlier data instance to indicate that it has been updated. This avoids the need to define a new data object when updating existing data with new information. Additionally, the SS data objects 180 allow for variable length updating, that is, updated data having a different length than the previous data instance can be written to available memory within the memory space allocated for an SS data object 180. An example of the type of data represented by an SS data object 180 is phone numbers of a user phone book. Management of SS data objects is discussed in greater detail in commonly assigned, co-pending U.S. application Ser. No. 10/975,577, entitled SINGLE SEGMENT DATA OBJECT MANAGEMENT, to Wong et al., filed Oct. 28, 2004, which is incorporated herein by reference.

As previously described, the linear object 150 (FIG. 5), the container object 160 (FIG. 6), the MS data object 168 (FIG. 7), and the SS data object 180 (FIG. 8) employ a header that includes data fields containing data related to the respective data object. Examples of the types of fields that can be included in the header of the data objects are as follows:

State=Object state of the data object;
ObjectType=type of data object (i.e., linear object, MS data object, SS data object);
Key=unique data object identifier;
HeaderSizeByte=header record size in bytes;
DataSizeByte=Data size in bytes; and
TimeStamp=optional timestamp field.

As the object state of a data object changes over time, the FDM updates the object state in the state field of the respective data object as the data transitions from one object state to another. Thus, the latest object state of a data object can be determined by the data contained in the state field.

FIG. 9 shows a table of object states that can be employed in the headers of the different data objects according to embodiments of the present invention. In summary, the "EMPTY" state indicates free erased memory space available for writing. The "WRITING_HDR_LEN" state indicates that a header length is being written. The "WRITING_HDR" state indicates that the data object header is in the process of being written, such as writing the object state, but there is currently no data stored. The "WRITTEN_HDR" state indicates that the header is complete. The "WRITING_DATA" state indicates that data is being written and the data size is known. The "WRITTEN_DATA" state indicates that data has been written but not yet marked as valid. The WRITTEN_DATA state distinguishes between a copy of an object and the original object during the data copying process, in the event power loss occurs during a reclamation process or an update process. The WRITTEN_DATA state also distinguishes the completed state of the object during the creation of the object for the first time in the event of power loss recovery. The VALID_DATA state indicates that the stored data is valid. The INVALID_DATA state indicates that the data is freed and, as will be explained in more detail below, is eligible for reclamation. As shown in the table of FIG. 9, the INVALID_DATA state can transition into an ERASE_PARTIAL or EMPTY state depending on whether the ERASE_PARTIAL state is applicable. The "ERASE_PARTIAL" state, indicates that the data beyond the boundary of a flash block is erased. This state can only exist in objects at the end of a list. As will be explained in more detail below, the granularity of the object states facilitates a power loss recovery process that can be used to recover data in the event of power loss and ensure uncorrupted data can be located.

As shown in the table of FIG. 9, the object state of a data object can be represented by a binary value. Each state change clears a single bit of the binary value. As the object state of a data object changes over time, the FDM updates the state field of the respective data object to reflect data transitions from one object state to another by programming the value corresponding to the new object state. As the object state of a data object transitions, for example, from an EMPTY state to a WRITING_HDR_LEN state, and where the least significant bit (LSB) corresponds to the WRITING_HDR_LEN state, the state field will change from 1111 1111 to 1111 1110. As known by those of ordinary skill in the art, in the case of NOR flash memory devices, an unprogrammed (i.e., erased) memory cell of flash memory is represented by a value of "1" and a programmed memory cell is represented by a value of "0" (in contrast to NAND flash memory devices, where the process is inverted). Consequently, in updating the object state from EMPTY to WRITING_HDR_LEN, the value 1111 1110 can be written directly to the state field without the need for erasing any cells because only the LSB needs to be programmed to indicate a change in object state. The other bits remain unprogrammed. As the object state transitions, each succeeding bit gets programmed to reflect the change in object states. For example, if the second to the LSB corresponds to a WRITING_HDR state, then the state field is modified from 1111 1110 to 1111 1100 when the state of the data object transitions from the WRITING_HDR_LEN state after the header record and state have been written. It will be appreciated that the previous example was provided for the purpose of illustration, and the correspondence of bits to states can be modified without departing from the scope of the present invention. Consequently, the foregoing example is not intended to limit the scope of the present invention to any particular embodiment.

The ObjectType field contains data representing the type of data object. The key field contains data representing a unique identifier that can be used to identify the particular data object. The DataSizeByte field contains data representing the length of the data field of the data object, allowing the memory space of each data object to be variable in length and defined by a developer. An optional TimeStamp field containing data representing the time at which the data object was written can also be included in the header when desired. The HeaderSizeByte field contains data indicative of the length of the header, and is used when optional fields are included in the header for some data objects and not for others. For example, where it is desirable for the optional TimeStamp field to be included in the data object header, the value of the HeaderSizeByte field can be specified to accommodate the additional length necessary to include the TimeStamp field. Other data objects not having the optional TimeStamp field will have shorter headers.

It will be appreciated by those of ordinary skill in the art that the particular information included in the header blocks of the data objects may be modified without departing from the scope of the present invention. The previous example has been provided for the purpose of illustration, and alternative fields and information can be included in the header as well. The particular information included in the headers of the data objects will depend on the relevance of that information to the particular type of data object. Moreover, it will also be appreciated that the previous example was provided for the purpose of illustration, and alternative fields and information can be included in the header of the different data objects without departing from the scope of the present invention. Consequently, the foregoing example is not intended to limit the scope of the present invention to any particular embodiment.

Various processes of the FDM use the information in the data object headers of the linear object 150, the container object 160, the MS data object 168, and the SS data object 180 in handling the data objects. For example, a power loss recovery process uses the information in the headers for data recovery in the event of a power failure. When a power recovery process is performed, the saved data can be restored by examining the state field in each header of the various data objects. That is, the power loss recovery process can make the determination on how to take action based on the object state of the data object. For example, assuming that the object states shown in FIG. 9 are being used, when the data object has an EMPTY state will no action be taken during the power loss recovery process. When the data object has a VALID_DATA state, the power loss recovery process determines whether any other copies of the data object exist and which copy should be recovered. For other object states, it is assumed that parts of the data object are unreliable or in an incomplete state, the data state is changed to an INVALID_DATA state, and are ignored by skipping past the appropriate portions of memory. The power loss recovery process will transition the information in the state field of the new data objects having a WRITTEN_DATA state to a VALID_DATA state, and any corresponding copies of the data objects having a VALID_DATA state to an INVALID_DATA state. In this manner, uncorrupted data can be guaranteed in the event flash operation is interrupted by power loss. Thus, in the worst case, a power failure during the updating of a data object results in the loss of the new data. The old data remains valid and can be recovered.

A reclamation process according to an embodiment of the present invention also uses the information of the state field to determine which blocks of memory of the volume 120 can be erased to reclaim memory when there is insufficient free memory space to allocate for a data object. A data object can be discarded by the reclamation process when the state of the data object is in the WRITING_HDR_LEN, WRITING_HDR, WRITTEN_HDR, WRITING_DATA, INVALID_DATA, and ERASE_PARTIAL states. In an embodiment of the present invention, the reclamation process is invoked by the FDM when more memory space needs to be allocated for a data object in the volume 120. The reclamation operation takes advantage of the dual list arrangement of embodiments of the present invention by selecting the direction for allocating from one list and reclaiming from the other list, and reversing the direction when all data objects in the second list have been reclaimed. As a result, the data movement of the reclamation process provides the benefit of wear leveling by distributing the programming and erasing operations evenly across the flash memory device. It will be appreciated by one of ordinary skill in the art that during a reclamation process, only the MS data objects 168 and SS data objects 180 that have a VALID_DATA state are copied when moving data objects from one list to the opposite list. That is, during reclamation of a container object, only MS data objects 168 and SS data objects 180 having a VALID_DATA state are copied into the new container object. In the event of a power loss, either the new or old container object will be recovered. Consequently, only the valid data objects or the original data objects will be recovered. In this manner, additional memory space can be recovered from within a container object 160 during the reclamation process, further compacting of data objects at one end of the volume 120. A more detailed description of a reclamation process that may be employed in embodiments of the present invention is provided in commonly assigned, co-pending U.S. application Ser. No. 10/232,955, entitled LINEAR OBJECT MANAGEMENT FOR A RANGE OF FLASH MEMORY, to Wong et al., filed Aug. 9, 2002, which is incorporated herein by reference.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for managing a range of memory in a flash memory space in which a plurality of data objects are stored, the range of memory defined between a first end and a second end opposite the first end, the method comprising:
    copying all valid data objects in a first list of data objects associated with the first end of the range of memory to a second list of data objects associated with the second end of the range of memory, the first list of data objects beginning at the first end and the second list of data objects beginning at the second end;
    invalidating data objects in the first list;
    erasing the memory in which invalid data objects in the first list are located; and
    redefining the location of the first end of the range of memory to another location in the flash memory space.

2. The method of claim 1, further comprising erasing memory in the flash memory space for the redefined location of the first end of the range of memory.

3. The method of claim 1 wherein redefining the location of the first end comprises redefining the location of the first end to increase the size of the range of memory.

4. The method of claim 1 wherein redefining the location of the first end comprises redefining the location of the first end to decrease the size of the range of memory.

5. The method of claim 1 wherein the range of memory comprises a first range of memory and a second range of memory is defined in the flash memory space, the second range of memory having a first end and a second end opposite the first end, the second end of the second range of memory coincident with the first end of the first range of memory, the method further comprising:
    copying all valid data objects of a second list of data objects associated with the second end of the second range of memory to a first list of data objects associated with the first end of the second range of memory;
    invalidating data objects in the second list of the second range of memory;
    erasing the memory in which invalid data objects in the second list are located; and redefining the location of the second end of the second range of memory in the flash memory space to maintain coincidence with the first end of the first range of memory.

6. The method of claim 5 wherein the first and second ranges of memory are defined by a starting block number and a block count and redefining the location of the first end of the first range of memory comprises updating the block count for the first range of memory and redefining the location of the second end of the second range of memory comprises updating the starting block number and the block count of the second range of memory.

7. The method of claim 1 wherein the range of memory is defined by a starting block number and a block count and redefining the location of the first end of the range of memory comprises updating the block count for the range of memory.

8. The method of claim 1 wherein at least one of the data objects comprises a linear object having a data area containing data residing at consecutive memory addresses.

9. The method of claim 1 wherein at least one of the data objects comprises a container object having a data area containing at least one non-linear object.

10. The method of claim 1 wherein the data objects stored in the range of memory comprise a header and a data area, the header having an object state field containing data representing an object state of the data object and invalidating data objects in the first list comprises updating the data of the respective object state fields to an invalid state.

11. The method of claim 1 wherein the range of memory is defined by a starting block number representing the first end of the range of memory and a block count value identifying the second end of the range of memory relative to the first end of the range of memory, the method further comprising:
  redefining the starting block number to move the range of memory in the flash memory space from a previous location to a current location;
  copying the valid data objects contained in the range of memory at the previous location to the range of memory at the current location; and
  invalidating data objects in the range of memory at the previous location.

12. A method for managing data objects in a flash memory space, the method comprising:
  allocating a first range of the flash memory space to a first volume defined by a first end and a second end opposite of the first end, the first volume containing at least one data object associated with the first end of the first volume and at least one data object associated with the second end of the first volume;
  allocating a second range of the flash memory space to a second volume defined by a first end and a second end opposite of the first end, the second end of the second volume coincident with the first end of the first volume, the second volume containing at least one data object associated with the first end of the second volume and at least one data object associated with the second end of the second volume;
  copying valid data objects associated with the first end of the first volume to the second end of the first volume;
  copying valid data objects associated with the second end of the second volume to the first end of the second volume;
  invalidating data objects of the first end of the first volume and data objects of the second end of the second volume;
  erasing the memory in which data objects at the first end of the first volume and at the second end of the second volume are located; and
  redefining the first end of the first volume and the second end of the second volume to maintain coincidence thereof and resize the respective volumes.

13. The method of claim 12, further comprising erasing memory in the flash memory space for the redefined location of the first end of the first volume and the second end of the second volume.

14. The method of claim 12 wherein at least one of the first and second volumes contains at least one linear object having a data area containing data residing at consecutive memory addresses and at least one container object having a data area containing at least one non-linear object.

15. The method of claim 12 wherein redefining the first end of the first end of the first volume and the second end of the second volume comprises redefining the first end of the first volume and the second end of the second volume to increase the size of the first range of flash memory space and decrease the size of the second range of flash memory space.

16. The method of claim 12 wherein redefining the first end of the first end of the first volume and the second end of the second volume comprises redefining the first end of the first volume and the second end of the second volume to decrease the size of the first range of flash memory space and increase the size of the second range of flash memory space.

17. The method of claim 12 wherein the data objects stored in the first and second volumes comprise a header and a data area, the header having an object state field containing data representing an object state of the respective data object and invalidating data objects comprises updating the data of the respective object state fields to an invalid state.

18. The method of claim 12 wherein allocating first and second ranges of the flash memory space to first and second volumes, respectively, comprises storing a starting block number and a block count for each of the volumes and redefining the first end of the first volume comprises updating the block count of the first volume and the redefining the second end of the second volume comprises updating the starting block number and the block count of the second volume.

19. A method of managing a range of memory in a flash memory space in which a plurality of data objects are contained, the method comprising:
  defining a starting block number representing a first end of the range of memory;
  defining a block count value identifying a second end of the range of memory relative to the first end of the range of memory;
  redefining the starting block number to move the range of memory in the flash memory space from a previous location to a current location;
  copying valid data objects contained in the range of memory at the previous location to the range of memory at the current location; and
  invalidating data objects in the range of memory at the previous location.

20. The method of claim 19, further comprising erasing memory at the current location in the flash memory space for the range of memory.

21. The method of claim 19 wherein the range of memory at the previous location and the range of memory at the current location do not overlap.

22. The method of claim 19 wherein the data objects contained in the range of memory comprise at least one linear object having a data area containing data residing at consecutive memory addresses and at least one container object having a data area containing at least one non-linear object.

23. The method of claim 19 wherein the data objects stored in the range of memory comprise a header and a data area, the header having an object state field containing data representing an object state of the data object and invalidating data objects comprises updating the data of the respective object state fields to an invalid state.

24. A computer-readable medium having computer-executable components for managing a range of memory in a flash memory space in which a plurality of data objects are stored, the range of memory extending between a first end and a second end opposite the first end, the computer-readable medium comprising:
 a copying component for copying all valid data objects in a first list of data objects associated with the first end of the range of memory to a second list of data objects associated with the second end of the range of memory, the first list beginning at the first end and the second list beginning at the second end;
 an invalidating component for invalidating data objects in the first list;
 an erasing component for erasing the memory in which invalid data objects in the first list are located; and
 a redefining component for redefining the location of the first end of the range of memory to another location in the flash memory space.

25. The computer-readable medium of claim 24 wherein the redefining component redefines the location of the first end to increase the size of the range of memory.

26. The computer-readable medium claim 24 wherein the redefining component redefines the location of the first end to decrease the size of the range of memory.

27. The method of claim 24 wherein the range of memory comprises a first range of memory and a second range of memory is defined in the flash memory space, the second range of memory having a first end and a second end opposite the first end, the second end of the second range of memory coincident with the first end of the first range of memory, and
 the copying component further copies all valid data objects in a second list of data objects associated with the second end of the second range of memory to a first list of data objects associated with the first end of the second range of memory;
 the invalidating component further invalidates data objects in the second list of the second range of memory;
 the erasing component further erases the memory in which invalid data objects in the second list are located; and
 the redefining component further redefines the location of the second end of the second range of memory in the flash memory space to maintain coincidence with the first end of the first range of memory.

28. The computer-readable medium of claim 27 wherein the redefining component defines the first and second ranges of memory by a starting block number and a block count and the redefining component redefines the location of the first end of the first range of memory by updating the block count for the first range of memory and redefines the location of the second end of the second range of memory by updating the starting block number and the block count of the second range of memory.

29. The computer-readable medium of claim 24 wherein the redefining component defines the range of memory by a starting block number and a block count and the redefining component redefines the location of the first end by updating the block count for the range of memory.

30. The computer-readable medium of claim 24 wherein at least one of the data objects comprises a linear object having a data area containing data residing at consecutive memory addresses.

31. The computer-readable medium of claim 24 wherein at least one of the data objects comprises a container object having a data area containing at least one non-linear object.

32. The computer-readable medium of claim 24 wherein the data objects stored in the range of memory comprise a header and a data area, the header having an object state field containing data representing an object state of the data object and the invalidating component invalidates data objects of the first list comprises updating the data of the respective object state fields to an invalid state.

33. The computer-readable medium of claim 24 wherein the range of memory is defined by a starting block number representing the first end of the range of memory and a block count value identifying the second end of the range of memory relative to the first end of the range of memory, and
 the redefining component redefines the starting block number to move the range of memory in the flash memory space from a previous location to a current location;
 the copying component copies the valid data objects contained in the range of memory at the previous location to the range of memory at the current location; and
 the invalidating component invalidates data objects in the range of memory at the previous location.

34. A computer-readable medium having computer-executable components for managing a range of memory in a flash memory space in which a plurality of data objects are contained, the computer-readable medium comprising:
 a defining component for defining a starting block number representing a first end of the range of memory and defining a block count value identifying a second end of the range of memory relative to the first end of the range of memory;
 a redefining component for redefining the starting block number to move the range of memory in the flash memory space from a previous location to a current location;
 a copying component for copying valid data objects contained in the range of memory at the previous location to the range of memory at the current location; and
 an invalidating component for invalidating data objects in the range of memory at the previous location.

35. The computer-readable medium of claim 34 wherein the range of memory at the previous location and the range of memory at the current location do not overlap.

36. The computer-readable medium of claim 34 wherein the data objects contained in the range of memory comprise at least one linear object having a data area containing data residing at consecutive memory addresses and at least one container object having a data area containing at least one non-linear object.

37. The computer-readable medium of claim 34 wherein the data objects stored in the range of memory comprise a header and a data area, the header having an object state field containing data representing an object state of the data object and the invalidating component invalidates data objects by updating the data of the respective object state fields to an invalid state.

38. A computer-readable medium having computer-executable components for managing data objects in a flash memory space, the computer-readable medium comprising:
- an allocating component for allocating a first range of the flash memory space to a first volume extending between a first end and a second end opposite of the first end, the first volume containing at least one data object associated with the first end of the first volume and at least one data object associated with the second end of the first volume and further allocating a second range of the flash memory space to a second volume extending between a first end and a second end opposite of the first end, the second end of the second volume coincident with the first end of the first volume, the second volume containing at least one data object associated with the first end of the second volume and at least one data object associated with the second end of the second volume;
- a copying component for copying valid data objects associated with the first end of the first volume to the second end of the first volume and further copying valid data objects associated with the second end of the second volume to the first end of the second volume;
- an invalidating component for invalidating data objects of the first end of the first volume and data objects of the second end of the second volume;
- an erasing component for erasing the memory in which invalid data objects at the first end of the first volume and at the second end of the second volume are located; and
- a redefining component redefining the first end of the first volume and the second end of the second volume to maintain coincidence thereof and resize the respective volumes.

39. The computer-readable medium of claim 38 wherein at least one of the first and second volumes contains at least one linear object having a data area containing data residing at consecutive memory addresses and at least one container object having a data area containing at least one non-linear object.

40. The computer-readable medium of claim 38 wherein the redefining component redefines the first end of the first volume and the second end of the second volume to increase the size of the first range of flash memory space and decrease the size of the second range of flash memory space.

41. The computer-readable medium of claim 38 wherein the redefining component redefines the first end of the first volume and the second end of the second volume to decrease the size of the first range of flash memory space and increase the size of the second range of flash memory space.

42. The computer-readable medium of claim 38 wherein the data objects stored in the first and second volumes comprise a header and a data area, the header having an object state field containing data representing an object state of the respective data object and the invalidating component invalidates data objects by updating the data of the respective object state fields to an invalid state.

43. The computer-readable medium of claim 38 wherein the allocating component allocates the first and second ranges of the flash memory space to first and second volumes, respectively, by storing a starting block number and a block count for each of the volumes and the redefining component redefines the first end of the first volume by updating the block count of the first volume and redefines the second end of the second volume by updating the starting block number and the block count of the second volume.

* * * * *